US011683249B2

(12) United States Patent
Thakkar et al.

(10) Patent No.: US 11,683,249 B2
(45) Date of Patent: *Jun. 20, 2023

(54) SOFTWARE DISTRIBUTION IN A WIRELESS AD HOC NETWORK FOR AD-HOC DATA PROCESSING ON A SOURCE NODE

(71) Applicant: THE BOEING COMPANY, Chicago, IL (US)

(72) Inventors: Rahul C. Thakkar, Leesburg, VA (US); Roland N. Freeman, Goose Creek, SC (US)

(73) Assignee: The Boeing Company, Arlington, VA (US)

( * ) Notice: Subject to any disclaimer, the term of this patent is extended or adjusted under 35 U.S.C. 154(b) by 157 days.

This patent is subject to a terminal disclaimer.

(21) Appl. No.: 17/191,270

(22) Filed: Mar. 3, 2021

(65) Prior Publication Data

US 2021/0281498 A1    Sep. 9, 2021

Related U.S. Application Data

(63) Continuation of application No. 16/511,711, filed on Jul. 15, 2019, now Pat. No. 10,944,657.

(51) Int. Cl.
*H04L 43/08* (2022.01)
*G06F 8/60* (2018.01)
(Continued)

(52) U.S. Cl.
CPC ............... *H04L 43/08* (2013.01); *G06F 8/60* (2013.01); *H04L 9/007* (2013.01); *H04L 9/3265* (2013.01);
(Continued)

(58) Field of Classification Search
CPC ......... H04L 43/08; H04L 12/18; H04L 9/007; H04L 9/3265
See application file for complete search history.

(56) References Cited

U.S. PATENT DOCUMENTS 7,124,101 B1 * 10/2006 Mikurak ............ G06Q 10/0631
705/7.12
8,289,845 B1    10/2012 Baldonado et al.
(Continued)

FOREIGN PATENT DOCUMENTS

WO    2010/028278 A2    3/2010

OTHER PUBLICATIONS

Extended European Search Report and Written Opinion from the corresponding European Patent Application No. 20180488.7, dated Jan. 13, 2021.
(Continued)

*Primary Examiner* — Raj Jain
(74) *Attorney, Agent, or Firm* — Womble Bond Dickinson (US) LLP

(57) ABSTRACT

A method of acquiring software by a source node in a wireless ad hoc network. The method includes the source node executing application software from which a need to process a particular modality of data is identified, and making a determination that the source node is incapable of processing the particular modality of data. Responsive to the determination, the source node searches a local module repository (MR) of the source node for a software module usable to process the particular modality of data, and responsive to the source node failing to locate the software module in the local MR, broadcasts a request for the software module to neighbor nodes of the plurality of nodes in radio range of the source node. The source node receives the software module from the neighbor node, and uses the software module to process the particular modality of data.

22 Claims, 10 Drawing Sheets

(51) Int. Cl.
*H04L 9/00* (2022.01)
*H04L 9/32* (2006.01)
*H04L 12/18* (2006.01)
*H04W 8/24* (2009.01)
*H04W 40/24* (2009.01)
*H04W 84/18* (2009.01)

(52) U.S. Cl.
CPC ............ *H04L 12/18* (2013.01); *H04W 8/245* (2013.01); *H04W 40/246* (2013.01); *H04W 40/248* (2013.01); *H04W 84/18* (2013.01)

(56) References Cited

U.S. PATENT DOCUMENTS

| | | | |
|---|---|---|---|
| 8,385,211 | B2 | 2/2013 | Scarlatti et al. |
| 10,154,398 | B2* | 12/2018 | Patil ............... H04W 40/10 |
| 10,944,657 | B2* | 3/2021 | Thakkar ............ H04L 45/566 |
| 2002/0152305 | A1 | 10/2002 | Jackson et al. |
| 2004/0018839 | A1 | 1/2004 | Andric et al. |
| 2009/0046601 | A1 | 2/2009 | Nordmark et al. |
| 2009/0138968 | A1 | 5/2009 | Serber |
| 2011/0212717 | A1 | 9/2011 | Rhoads et al. |
| 2014/0280398 | A1* | 9/2014 | Smith ............. H04L 69/326 707/825 |
| 2014/0330986 | A1 | 11/2014 | Bowes et al. |
| 2016/0359878 | A1* | 12/2016 | Prasad ............ G06F 16/1744 |
| 2017/0013487 | A1* | 1/2017 | Skaaksrud ........... H04W 4/80 |
| 2019/0121357 | A1 | 4/2019 | Zhang et al. |
| 2021/0281498 | A1* | 9/2021 | Thakkar ............ H04W 8/245 |

OTHER PUBLICATIONS

Aloi, et. al. STEM-NET: How to deploy a self-organizing network of mobile end-user devices for emergency communication. Computer Communications, vol. 60, Apr. 1, 2015, pp. 12-27. Retrieved from the Internet <UR:L https://www.sciencedirect.com/science/article/abs/pii/S0140366415000511?via%3Dihub> <DOI: 10.1016/j.comcom.2015.01.023>.

Hussain, M., et al. Fog Assisted Cloud Models for Smart Grid Architectures—Comparison Study and Optimal Deployment. Cornell University Library, New York, May 14, 2018. 27 pages. Retrieved from the Internet <URL: https://arxiv.org/abs/1805.09254> <arXiv: 1805.09254>.

Riva, O., et al. The DYNAMOS approach to support context-aware service provisioning in mobile environments. Journal of Systems and Software, vol. 80, Issue 12, Dec. 2007, pp. 1956-1972. Retrieved from the Internet <URL: sciencedirect.com/science/article/abs/pii/S0164121207000738?via%3Dihub> <DOI: 10.1016/j.jss.2007.03.009>.

Roussain H., et al. Cooperative Component-Based Software Deployment in Wireless Ad Hoc Networks. University of South Brittany, Nov. 2005, Grenoble, France, pp. 1-16. Retrieved from the Internet <URL: https://hal.archives-ouvertes.fr/hal-00341748>.

* cited by examiner

SOFTWARE DISTRIBUTION IN A WIRELESS AD HOC NETWORK FOR AD-HOC DATA PROCESSING ON A SOURCE NODE

CROSS-REFERENCE TO RELATED APPLICATION

This application is a continuation of U.S. patent application Ser. No. 16/511,711, entitled: Software Distribution in a Wireless Ad Hoc Network for Ad-Hoc Data Processing on a Source Node, filed on Jul. 15, 2019, the content of which is incorporated herein by reference in its entirety.

TECHNOLOGICAL FIELD

The present disclosure relates generally to software distribution and, in particular, to software distribution in a wireless ad hoc network for ad-hoc data processing on a source node such as an autonomous machine.

BACKGROUND

Many modern machines are designed to operate with increased autonomy relative to other machines that require well-trained operators to safely operate. These autonomous machines include autonomous robots and a variety of unmanned vehicles, including unmanned ground vehicles (UGVs), unmanned aerial vehicles (UAVs), unmanned surface vehicles (USVs), unmanned underwater vehicles (UUVs) and unmanned spacecraft. A number of these autonomous machines are equipped with sensors and use software modules to process data produced or provided by those sensors.

Autonomous machines are often pre-loaded so that once on a mission, the software modules may be used to process data based on the purpose of the mission. An autonomous machine may directly or indirectly communicate with other autonomous machines, or one or more hubs such as ground stations, to report on data acquired by its sensors. Autonomous machines are getting smarter, becoming learning systems that are capable of determining their incapability of processing a particular modality of data produced or provided by one or more of their sensors. But once on a mission, distributing a software module to enable an autonomous machine to process the particular modality of data becomes more complicated, often requiring human intervention.

Therefore it would be desirable to have a system and method that takes into account at least some of the issues discussed above, as well as other possible issues.

BRIEF SUMMARY

Example implementations of the present disclosure are directed to software distribution and, in particular, to software distribution in a wireless ad hoc network for ad-hoc data processing on a source node such as an autonomous machine. Example implementations provide an intelligent, transactional, distributed and federated method of acquiring software in a wireless ad hoc network—such as a network of autonomous machines. The method may include automatically determining the need to process a modality of data, finding a software module usable to process the modality of data by communicating across nodes in the wireless ad hoc, acquiring the software module and using it to process the modality of data, without human intervention.

Example implementations may enable a wireless ad hoc network including autonomous machines deployed on a mission, self-describing the mission, finding software modules usable to achieve goals of the mission, and fulfilling the mission based on achieving those goals.

The present disclosure thus includes, without limitation, the following example implementations.

Some example implementations provide a method of acquiring software by a source node in a wireless ad hoc network that includes a plurality of nodes, the method comprising the source node executing application software from which a need to process a particular modality of data is identified; making a determination that the source node is incapable of processing the particular modality of data; and responsive to the determination, searching a local module repository (MR) of the source node for a software module usable to process the particular modality of data; broadcasting a request for the software module to those of the plurality of nodes in radio range of the source node that are thereby neighbor nodes, responsive to the source node failing to locate the software module in the local MR, the request causing a neighbor node of the neighbor nodes to search a respective local MR of the neighbor node for the software module, rebroadcasting the request to those of the plurality of nodes in radio range of the neighbor node that are thereby further neighbor nodes, when the neighbor node fails to locate the software module in the respective local MR, and receive the software module from a further neighbor node of the further neighbor nodes; and the source node further, receiving the software module from the neighbor node; and using the software module to process the particular modality of data.

In some example implementations of the method of any preceding example implementation, or any combination of any preceding example implementations, the source node has a collection of sensors, and the method further comprises a sensor of the sensors producing or providing the particular modality of data to the application software from which the need to process the particular modality of data is identified.

In some example implementations of the method of any preceding example implementation, or any combination of any preceding example implementations, the determination is made by the application software.

In some example implementations of the method of any preceding example implementation, or any combination of any preceding example implementations, the determination is made from a request received by the source node from a remote terminal.

In some example implementations of the method of any preceding example implementation, or any combination of any preceding example implementations, searching the local MR includes searching the local MR for the software module that is specifically identified, and wherein broadcasting the request includes broadcasting the request that specifically identifies the software module.

In some example implementations of the method of any preceding example implementation, or any combination of any preceding example implementations, searching the local MR includes searching the local MR for any software module usable to process the particular modality of data, without specific identification of the software module, and wherein broadcasting the request includes broadcasting the request that describes the particular modality of data, and excludes specific identification of the software module.

In some example implementations of the method of any preceding example implementation, or any combination of any preceding example implementations, the source node receiving the software module from the neighbor node includes the source node receiving a response from the neighbor node that indicates the neighbor node has the software module; unicasting a second request for the software module to the neighbor node; and receiving the software module from the neighbor node in response to the second request.

In some example implementations of the method of any preceding example implementation, or any combination of any preceding example implementations, using the software module includes the source node performing an operating-system-level containerization, including creating and launching an isolated container on the source node in which to use the software module, creating the isolated container including installing the software module in the isolated container.

Some example implementations provide a method of acquiring software by a source node in a wireless ad hoc network that includes a plurality of nodes those of which in radio range of the source node being neighbor nodes, the method comprising a neighbor node of the neighbor nodes receiving a request from the source node for a software module usable to process a particular modality of data, responsive to the source node failing to locate the software module in a local model repository (MR), the request broadcast from the source node to the neighbor nodes, the neighbor node responsive to the request: searching a respective local MR of the neighbor node for the software module; rebroadcasting the request to those of the plurality of nodes in radio range of the neighbor node that are thereby further neighbor nodes, responsive to the neighbor node failing to locate the software module in the respective local MR; receiving the software module from a further neighbor node of the further neighbor nodes; and returning the software module to the source node that uses the software module to process the particular modality of data.

In some example implementations of the method of any preceding example implementation, or any combination of any preceding example implementations, the request includes a unique identifier, and the method further comprises the neighbor node verifying that the request is a new request for the particular software module from the source node, using the unique identifier and a record of previous requests received by the neighbor node.

In some example implementations of the method of any preceding example implementation, or any combination of any preceding example implementations, searching the respective MR includes searching the respective MR for the software module that is specifically identified, and wherein rebroadcasting the request includes rebroadcasting the request that specifically identifies the software module.

In some example implementations of the method of any preceding example implementation, or any combination of any preceding example implementations, searching the respective MR includes searching the respective MR for any software module usable to process the particular modality of data, without specific identification of the software module, and wherein rebroadcasting the request includes rebroadcasting the request that describes the particular modality of data, and excludes specific identification of the software module.

In some example implementations of the method of any preceding example implementation, or any combination of any preceding example implementations, the neighbor node receiving the software module from the further neighbor node includes the neighbor node receiving a response from the further neighbor node that indicates the further neighbor node has the software module; unicasting a second request for the software module to the further neighbor node; and receiving the software module from the further neighbor node in response to the second request.

In some example implementations of the method of any preceding example implementation, or any combination of any preceding example implementations, the neighbor node returning the software module to the source node includes the neighbor node sending a response to the source node that indicates the neighbor node has the software module; receiving a second request for the software module unicast from the source node; and returning the software module to the source node in response to the second request.

Some example implementations provide a source node operable in a wireless ad hoc network that includes a plurality of nodes, the source node comprising a memory configured to store computer-readable program code; and processing circuitry configured to access the memory, and execute the computer-readable program code to cause the source node to at least perform the method of any preceding example implementation, or any combination of any preceding example implementations.

Some example implementations provide a neighbor node operable in a wireless ad hoc network that includes a plurality of nodes those of which in radio range of a source node being neighbor nodes, the neighbor node comprising a memory configured to store computer-readable program code; and processing circuitry configured to access the memory, and execute the computer-readable program code to cause the neighbor node to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
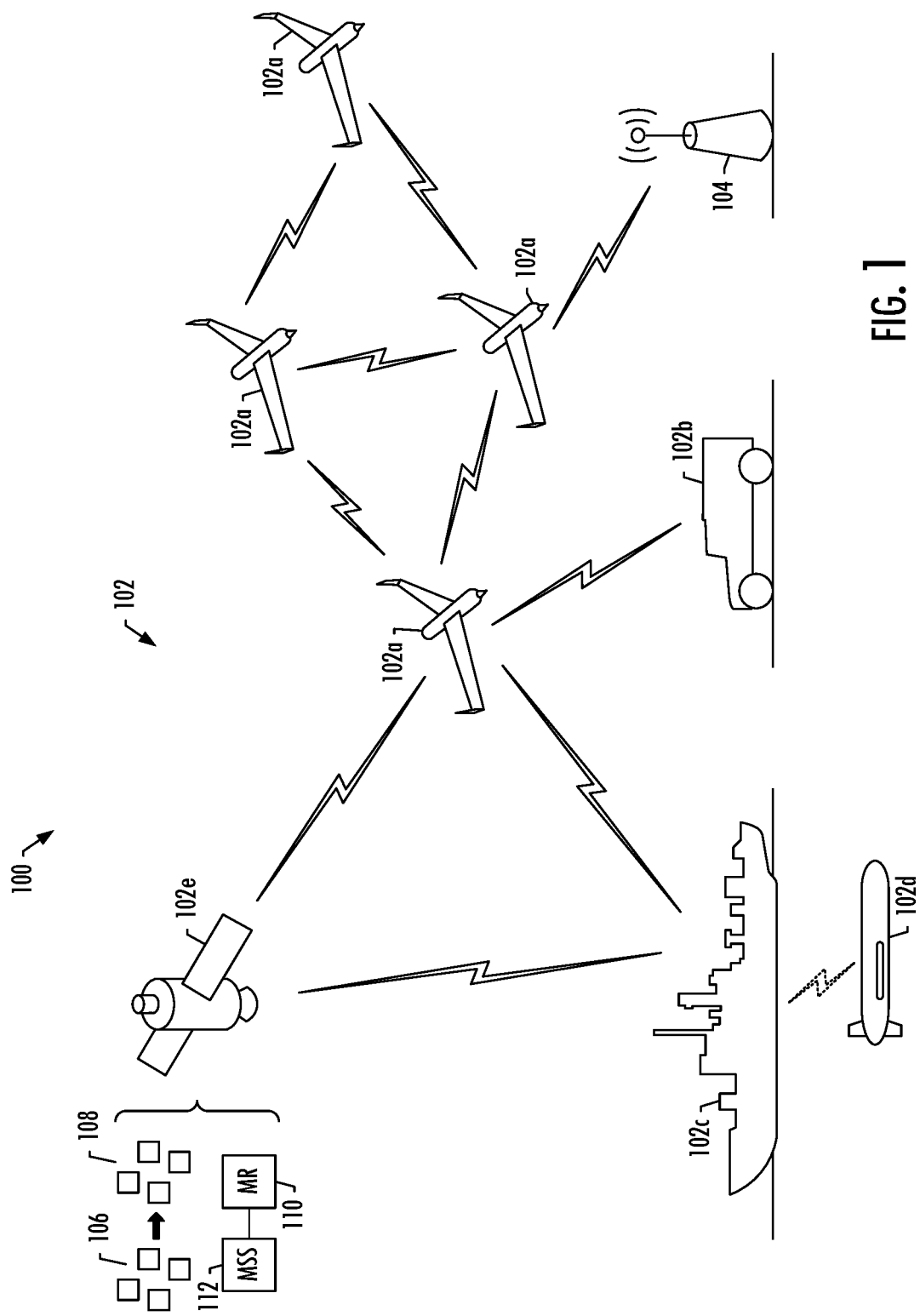
FIG. 1 illustrates a wireless ad hoc network for which example implementations of the present disclosure may be useful.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure relate generally to software distribution and, in particular, to software distribution in a wireless ad hoc network for ad-hoc data processing on a source node. Some example implementations provide a method of acquiring software by a source node in a wireless ad hoc network that includes a plurality of nodes. As described herein, a "node" is a physical network node—an active electronic device capable of creating, transmitting or receiving information over a communications channel. One example of a suitable node is an autonomous machine, which is a machine configured to carry out a mission independent of or with minimal human intervention. And examples of suitable autonomous machines include autonomous robots and a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like.

FIG. 1 illustrates a wireless ad hoc network 100 for which example implementations of the present disclosure may be useful. As shown, the wireless ad hoc network includes nodes shown as a variety of unmanned vehicles 102, including a number of UAVs 102a, a UGV 102b, a USV 102c, a UUV 102d and an unmanned spacecraft 102e that are deployable on missions. A mission may involve one of the unmanned vehicles, or more than one of the unmanned vehicles during which the unmanned vehicles may communicate with one another. In this regard, the unmanned vehicles may communicate with one another, and with a ground station 104 (another node), over respective communication channels. Although shown as a network of unmanned vehicles, it should be understood that the wireless ad hoc network may include one or more autonomous robots or other autonomous machines, in addition to or in lieu of the unmanned vehicles. And as explained below, even more generally, the wireless ad hoc network may simply include a plurality of nodes.

Each of one or more of the nodes of the wireless ad hoc network, including unmanned vehicles 102 and/or ground station 104 may include a collection of sensors 106, software modules 108, a module repository (MR) 110 and module search service (MSS) 112 (shown specifically for the unmanned spacecraft 102e).

In some examples, the collection of sensors 106 are configured to collect data while the unmanned vehicle is on a mission, and the software modules 108 are for processing or analysis of the data, such as for planning, collection, analysis, data distribution or the like. In this regard, the unmanned vehicle 102 may process raw data and store it locally, and may further transmit it if possible and necessary. In some examples, the software modules may also be used to add metadata to the raw data, which may be stored and/or transmitted with the raw data.

A software module 108 is a computer program configured to take one or more sources of input data (raw or derived), and zero or more sources of configuration controls that determine how the data shall get manipulated, and produce one or more output modalities of data. The software modules use one or more well-known or pre-defined interfaces to communicate with its host computer or with other software modules or workflows. A software module may follow a known communication protocol via plugin endpoints such via an API (application programming interface). For example, a software module may use Hypertext Transfer Protocol Secure (HTTPS) protocol with published Representational State Transfer (REST) APIs.

One or more of the software modules 108 may enable the creation and execution of a workflow. A workflow includes software modules organized in an execution hierarchy such as a DAG (directed acyclic graph) to derive data or as a feedback control system to improve output data quality within the workflow. A workflow is an interlinking of software modules such that the output of one software module serves as input or control for another in a DAG configuration or in a deterministic feedback mechanism that improves the output of the workflow in some fashion. A workflow may also serve as a software module. A software module or a workflow can be executed as a linear program or parallelized based on design, implementation and capability.

The software modules 108 (and workflows) may have similar or varying capabilities. A software module may have permission to read and, when appropriate, write data. A software module may read raw data and may generate further data in the form of derived data. A software may or may not have permission to manipulate raw or derived data. In this regard, a software module may read derived data and generate even further data in the form of further derived data. Derived data may be smaller or larger than (source) data from which it was derived. Derived data, if smaller, may be a fraction of the source data.

Data (raw or derived) in its partial or complete form, depending on available communication capability, connectivity and authorization, may be delivered as a service to one or more destinations. Examples of suitable destinations include other unmanned vehicles 102, ground stations 104, manned vehicles, mobile or fixed communication terminals or the like.

Examples of suitable software modules 108 include computer vision modules, content management modules, data optimization modules, data reduction modules, data quantization modules, data analysis modules, machine-to-machine communication modules, machine learning (ML) modules, artificial intelligence (AI) engines, client software modules that communicate with other software modules on board the same unmanned vehicle 102 or onboard other unmanned vehicles.

In addition to sensors 106 and software modules 108, the unmanned vehicle 102 (as well as the ground station 104) may also include a MR 110 and MSS 112. An MR and an MSS may be running on one or more computers in a distributed fashion. An MR and an MSS may also be running on computers on unmanned vehicles 102.

The MR 110 is a repository that contains one or more software modules 108 (uninstalled copies of software modules). Examples of well-known commercial MRs include Docker Hub and Amazon Container Registry. The MR stores the software modules on a storage device and manages CRUD (create, read, update and delete) operations on software modules, licensing, version control and the like, similar to well-known MRs.

The MSS 112 is a service running on a computer onboard the unmanned vehicle 102 (or ground station 104). The MSS provides a list of software modules 108 that are available and the nodes on which the software modules are available on based on search criteria. The MSS learns over time no different than well-known search engines as to the capabilities of available software modules, search requests from unique nodes, the requirements of various nodes, new content being published and old content being removed.

In accordance with example implementations of the present disclosure, the MSSs 112 onboard the unmanned vehicles 102 (and perhaps also the ground station 104) may form a dynamic mesh network, which may be organized in a form similar to a typical Domain Name System (DNS) network. Requests and responses may be handled via APIs hosted by servers onboard the unmanned vehicles. The MSS mesh across connected unmanned vehicles may also be organized in a form similar to a content delivery network (CDN).

In accordance with example implementations of the present disclosure, an MSS 112 running on an unmanned vehicle 102 may be configured to search for one or more requested software modules 108 within its own MR 110, or broadcast a request to other MSSs to search for the requested software modules in their respective MRs. To avoid circular requests, each request may carry with it a unique identifier such as a universally unique identifier (UUID), which may also hold or carry with it a timestamp (e.g., Coordinated Universal Time), requesting unmanned vehicle identifier, security token, access control parameters and other identifiers and permissions such as those that may be found in a standard web-based security token.

When a MSS 112 receives a request from a requesting MSS, it may verify that it has not already received and processed the same request in a recent past. To verify a request, the MSS may compare timestamped tokens from previous requests. In this regard, the MSS may sort previous requests by when its unmanned vehicle 102 received those requests, the identifier of the requesting unmanned vehicles, and when the requests were made. If the MSS has already received and processed the same request in the recent past, the MSS may simply ignore the request, or it may additionally return an error to the requesting MSS to notify the requesting MSS that the request is a duplicate or potentially circular request.

To illustrate example implementations of the present disclosure, consider a first of the unmanned vehicles 102 (a first unmanned vehicle) has an AI engine that detects a new pattern and new modality of data within the data collected by one or more of its sensors 106. The AI engine identifies a need to process the new modality of data, but determines that the first unmanned vehicle lacks a software module 108 usable to process the new modality of data.

The AI engine of the first unmanned vehicle 102 creates a description of the problem, and the MSS 112 (a first MSS) of the first unmanned vehicle broadcasts a request including the description of the problem, and may include with the request, a unique token (a first token) pointing back to the first unmanned vehicle and to the request. The first MSS may broadcast the request either using a pre-defined protocol or as free form content (after an unsuccessful search of its local MR 110). The first MSS may broadcast the request using a well-known protocol such as Hypertext Transfer Protocol (HTTP), Transmission Control Protocol/Internet Protocol (TCP/IP), User Datagram Protocol (UDP) or the like, optionally using encryption or other well-known or proprietary security mechanisms. In this regard, the first MSS may use a proprietary method of packaging the request and broadcasting it, optionally using encryption or other well-known or proprietary security mechanisms.

The MSS 112 (a second MSS) of a second of the unmanned vehicles 102 (a second unmanned vehicle) receives the request, and may validate the request to see if the first MSS is authorized to make a request and receive a software module 108. In case of error, the second MSS may return "permission denied" or may choose not to respond for reasons of security. Similarly, the second MSS may check if it has already received and processed the request containing the first token; and if yes, the second MSS may return and a "duplicate request" error message.

If the check reveals the request is unique, the second MSS 112 may search its local MR 110 for a software module 108 (one or more) that delivers a solution to the problem described in the request. If the second MSS fails to locate such a software module, the second MSS may rebroadcast the request to the MSSs of others of the unmanned vehicles 102. On the other hand, if the second MSS does locate such a software module in its local MR, the second MSS may send a response to the first MSS that it has a software module that may solve the problem. The first MSS may receive the response from the second MSS. The first unmanned vehicle may request, and in response receive, the software module from the MR of the second unmanned vehicle. The first unmanned vehicle may validate the module (e.g., for integrity and security), and launch the software module and use it to process the new modality of data. In case of an error, or if the first unmanned vehicle fails to receive a response within a specific time period, the first unmanned vehicle may retry or abandon the request, such as based on a machine learning inference engine decision or a heuristic programmed into the software application.

Figure 2:
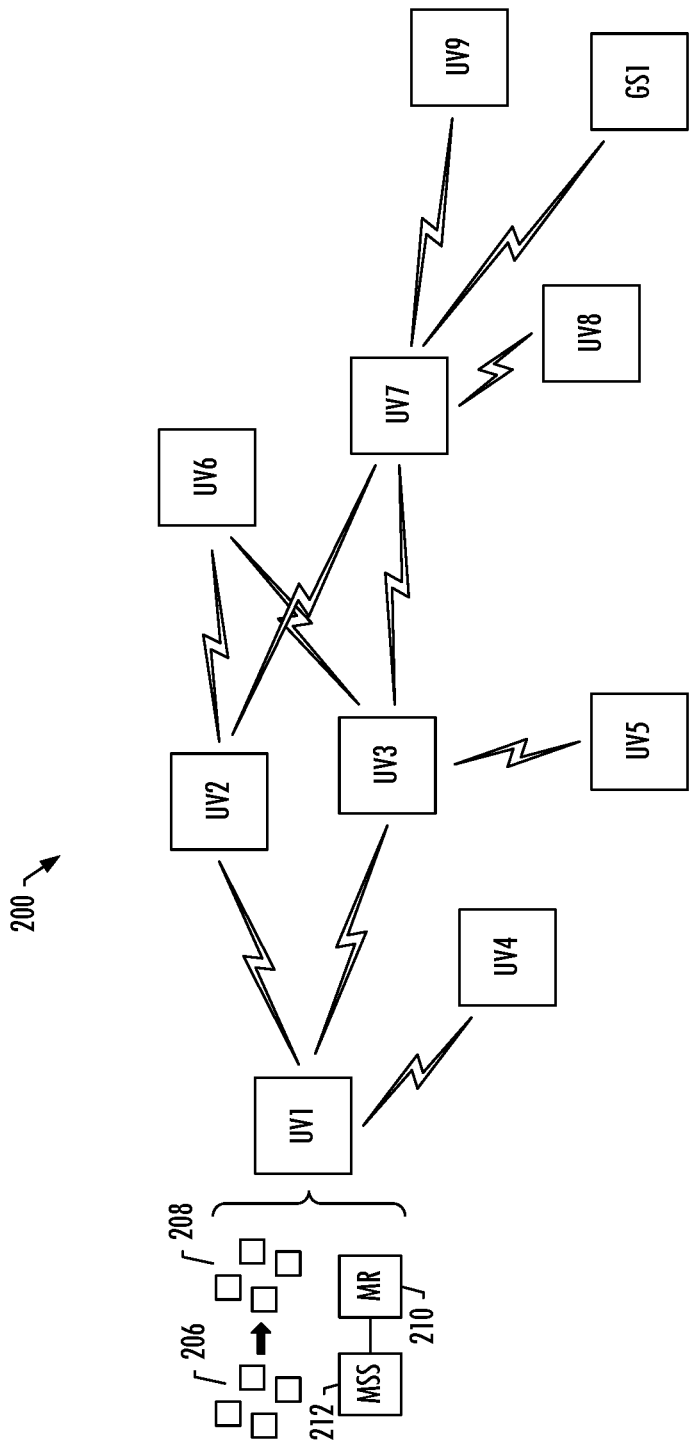
FIG. 2 illustrates a wireless ad hoc network including a number of unmanned vehicles and a ground station, according to example implementations of the present disclosure.

FIG. 2 illustrates a wireless ad hoc network 200 including nine unmanned vehicles UV1-UV9 that may correspond to unmanned vehicles 102, and a ground station GS1 that may correspond to ground station 104, according to example implementations of the present disclosure. Each of one or more of the unmanned vehicles UV1-UV9 may include sensors 206, software modules 208, a MR 210 and MSS 212, which may correspond to respective ones of sensors 106, software modules 108, MR 110 and MSS 112. The ground station GS1 may also include at least a respective MR and MSS.

In this regard, consider an example in which UV1 is on a mission, its sensors are capturing data, and it has an AI engine processing the data. The AI engine identifies a need to process a new modality of data, and it needs to search for one or more software modules M that can solve the problem of processing the new modality of data. Others of the unmanned vehicles, namely, UV4 and UV7, have software module M, as does the ground station GS1.

Among the unmanned vehicles, UV2, UV3 and UV4 are in radio range of UV1 at time T1. Unmanned vehicle UV2 is further in radio range of UV6 and UV7, and unmanned vehicle UV3 is further in radio range of UV5, UV6 and UV7. And unmanned vehicle UV7 is further in radio range of UV8 and UV9, as well as ground station GS1.

Figure 3A:
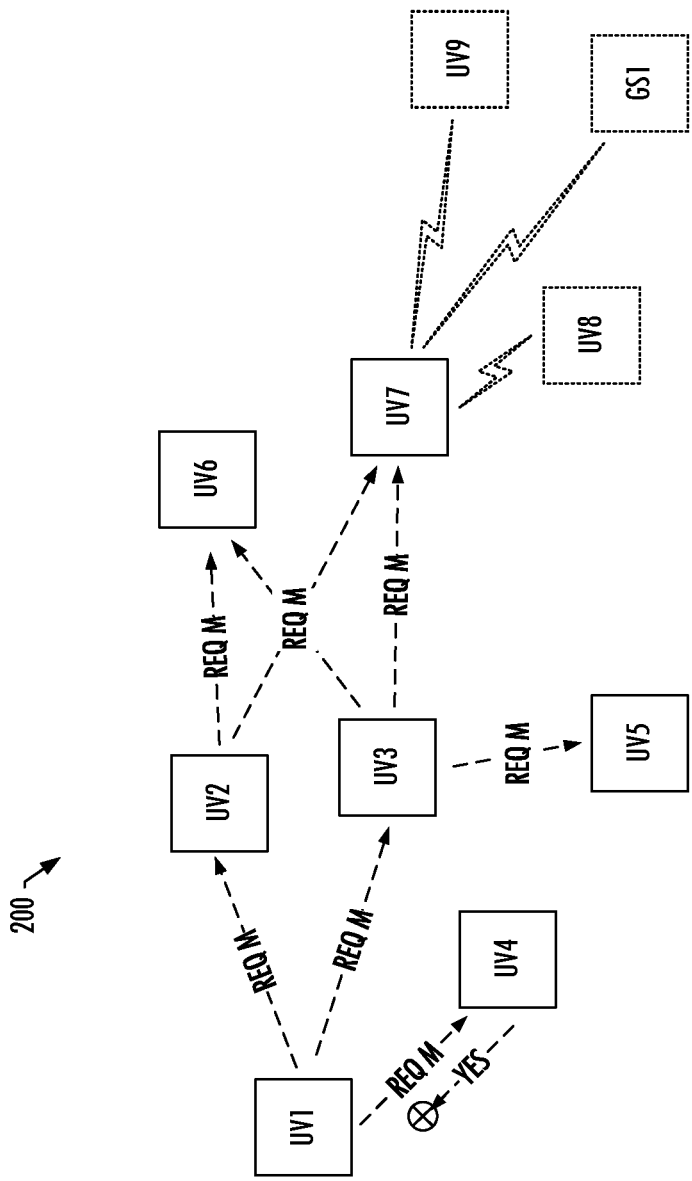
FIGS. 3A, 3B, 3C and 3D illustrate a process by which an unmanned vehicle (a source node) may acquire a software module, according to some example implementations of the present disclosure.

FIGS. 3A-3D illustrate a process by which unmanned vehicle UV1 (a source node) may acquire a software module M, with reference to the wireless ad hoc network 200 of FIG. 2, according to some example implementations of the present disclosure (without separate illustration of the sensors 206, software modules 208, MR 210 and MSS 212). When the AI engine of UV1 identifies the need to process the new modality of data, UV1 requests software module M usable to process the new modality of data. As shown in FIG. 3a, when the MSS 212 of UV1 fails to locate the software module M in its local MR 210, the MSS broadcasts the request to UV1's neighbors—i.e., UV2, UV3 and UV4 in radio range of UV1. Unmanned vehicles UV2, UV3 and UV4 receive the request.

Unmanned vehicle UV4 has software module M, and sends a response to the request; but due to connection issues, it is now out of radio range of UV1, so the response does not reach UV1 and eventually times out. Unmanned vehicles UV2 and UV3 do not have software module M so they rebroadcast the request. In particular, UV3 rebroadcasts the request to its further neighbors, i.e., UV5, UV6 and UV7 in further radio range of UV3. And unmanned vehicle UV2 rebroadcasts the request to its further neighbors, i.e., UV6 and UV7 in further radio range of UV2.

Figure 3B:
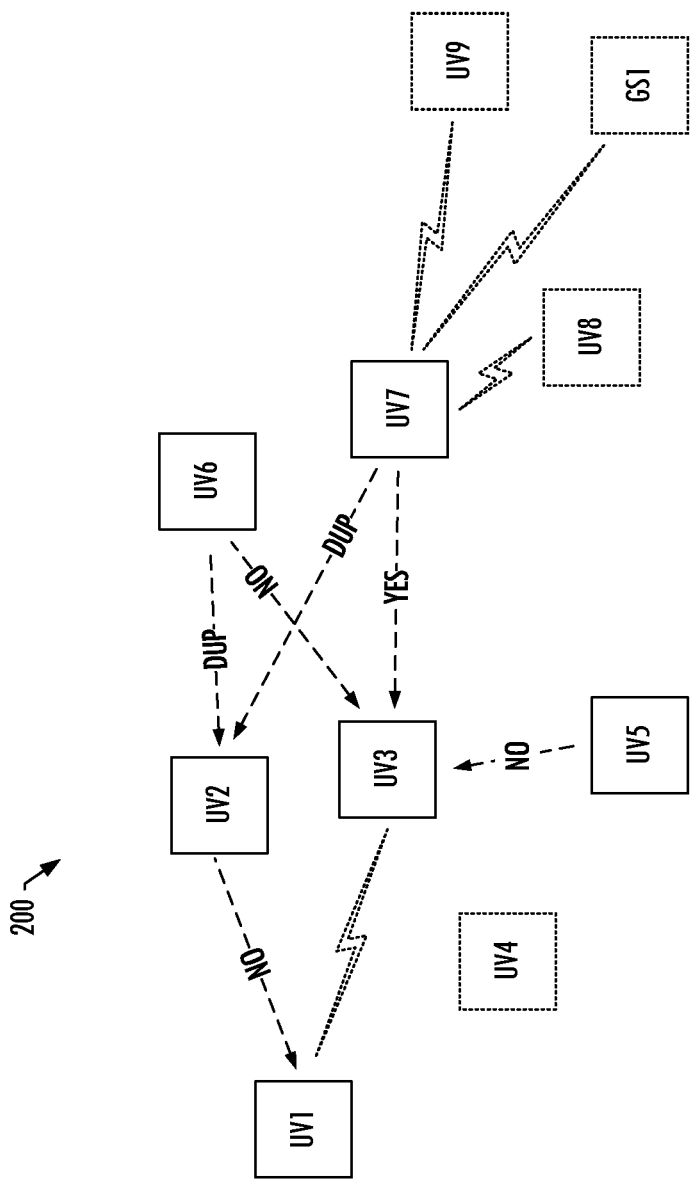

As shown in FIG. 3B, unmanned vehicles UV5 and UV7 do not have software module M and send a NO response UV3. Unmanned vehicle UV7 has the software module M, and sends a YES response to UV3. Since UV6 and UV7 already received the request from UV3, they ignore the request rebroadcast by UV2, or send a duplicate request error to UV2. Unmanned vehicle UV2 accordingly sends a NO response to UV1.

Figure 3C:
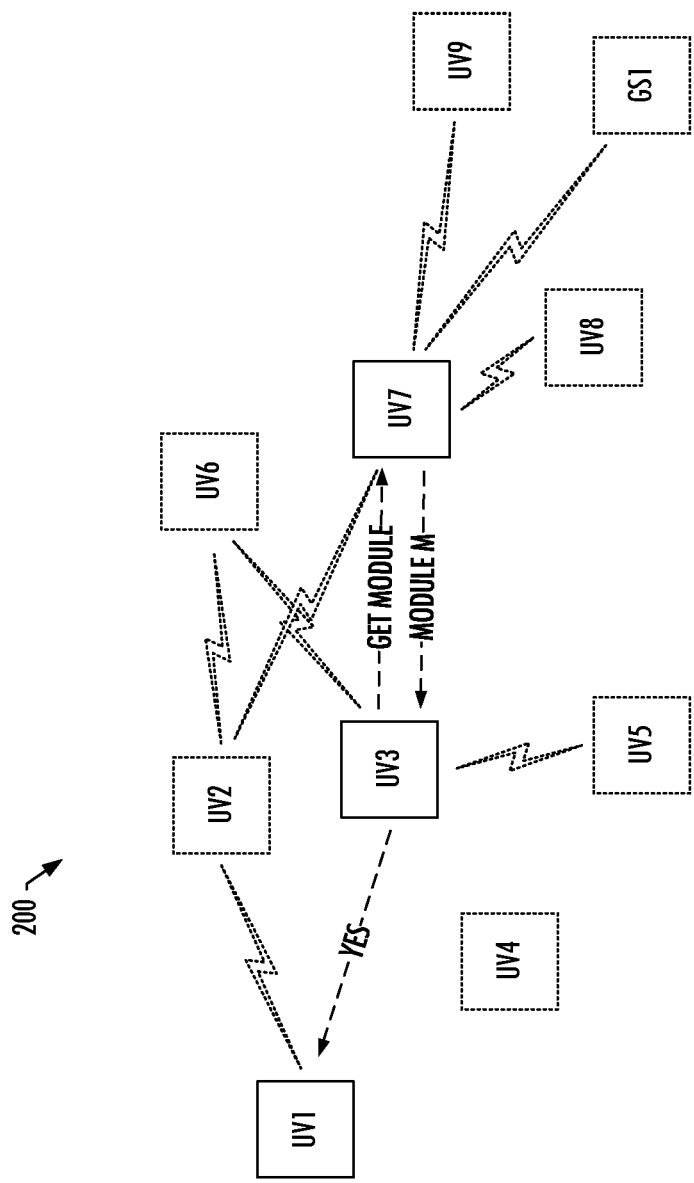

As shown in FIG. 3C, in response to the YES response from UV7, unmanned vehicle UV3 sends a GET MODULE request for software module M to UV7. In response, UV3 receives software module M from UV7, validates and saves software module M in its local MR 210, and updates its MSS 212 to reflect that it now has software module M. Unmanned vehicle UV3 also sends a YES response to UV1.

Figure 3D:
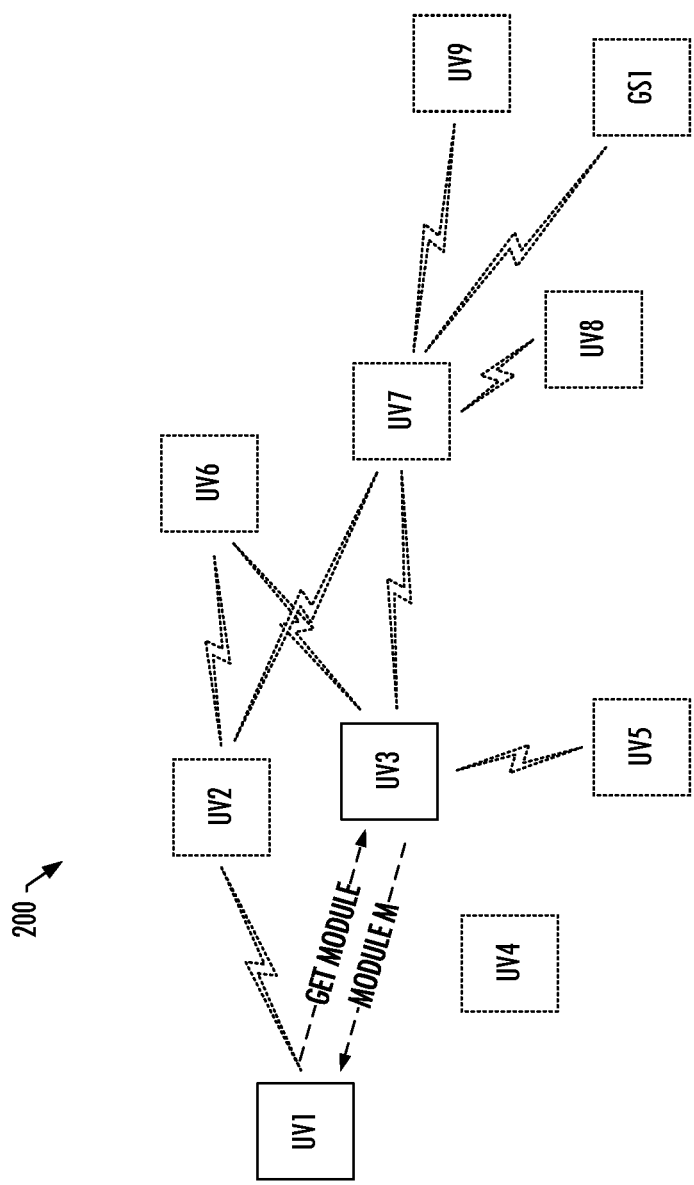

As shown in FIG. 3D, in response to the YES response, unmanned vehicle UV1 sends a GET MODULE for software module M to UV3. Unmanned vehicle UV1 receives software module M from UV3, validates and saves software module M in its local MR 210, and updates its MSS 212 to reflect that it now has software module M. Unmanned vehicle UV1 launches software module M by a known set of rules, and initializes and connects to software module M. Unmanned vehicle UV1 may also test software module M, and if UV1 encounters a failure, log it and terminate software module M. Otherwise, UV1 is ready to use software module M. And in some examples, UV1 returns and logs may be further received for aggregation and analysis.

As indicated above, although described primarily in the context of unmanned vehicles, example implementations of the present disclosure are more generally applicable to a wireless ad hoc network that includes a plurality of nodes. Other examples of suitable nodes include computers such as desktop computers, server computers, portable computers (e.g., laptop computer, tablet computer), mobile phones (e.g., cell phone, smartphone), wearable computers (e.g., smartwatch), or the like. These computers may be stand-alone or embedded within a larger mechanical or electrical system.

Figure 4:
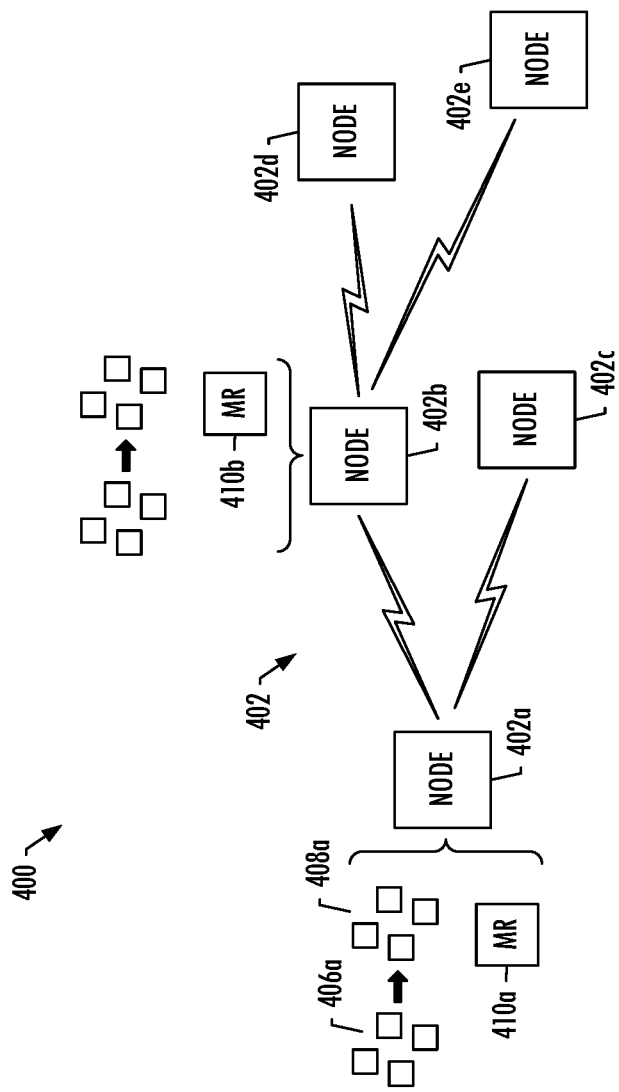
FIG. 4 illustrates a wireless ad hoc network according to example implementations of the present disclosure.

FIG. 4 illustrates a wireless ad hoc network 400 that includes a plurality of nodes 402, according to example implementations of the present disclosure. The plurality of nodes include a source node 402a configured to execute application software 408a from which a need to process a particular modality of data is identified. In some examples, the source node has a collection of sensors 406a, a sensor of which is configured to produce or provide the particular modality of data to the application software 408a from which the need to process the particular modality of data is identified.

The source node 402a is configured to make a determination that the source node is incapable of processing the particular modality of data. In some examples, the determination is made by the application software 408a. In other examples, the determination is made from a request received by the source node from a remote terminal such as a ground station.

Responsive to the determination, the source node 402a is configured to search a local module repository MR 410a of the source node for a software module usable to process the particular modality of data. The source node is configured to broadcast a request for the software module to those of the plurality of nodes in radio range of the source node that are thereby neighbor nodes 402b, 402c, responsive to the source node failing to locate the software module in the local MR. Although not shown separately shown for all of the nodes 402, in some examples, the source node as well as other nodes of the wireless ad hoc network 400 may also include a local MSS, sensors and/or software modules.

In some examples, the source node 402a is configured to search the local MR 410a for the software module that is specifically identified, and broadcast the request that specifically identifies the software module. In other examples, the source node is configured to search the local MR for any software module usable to process the particular modality of data, without specific identification of the software module. In these other examples, the source node is configured to broadcast the request that describes the particular modality of data, and excludes specific identification of the software module.

Responsive to the request broadcast by the source node 402a, a neighbor node 402b of the neighbor nodes is configured to search a respective local MR 410b of the neighbor node for the software module. The neighbor node is configured to rebroadcast the request to those of the plurality of nodes in radio range of the neighbor node that are thereby further neighbor nodes 402d, 402e, responsive to the neighbor node failing to locate the software module in the respective local MR. And the neighbor node is configured to receive the software module from a further neighbor node 402d of the further neighbor nodes.

The source node 402a is configured to receive the software module from the neighbor node 402b. In some examples, this includes the source node 402*a* configured to receive a response from the neighbor node 402*b* that indicates the neighbor node has the software module. In these examples, the source node is configured to unicast a second request for the software module to the neighbor node and receive the software module from the neighbor node in response to the second request.

Following receipt of the software module, the source node 402*a* is configured to use the software module to process the particular modality of data. In some examples, the source node is configured to perform an operating-system-level containerization. This includes the source node configured to create and launch an isolated container on the source node in which to use the software module. An isolated container is an operating-system-level (OS-level) virtualization. It is distinct from and generally requires less overhead than a hardware virtualization in which a hypervisor (instead of a container engine) is used to create a virtual machine to emulate a node. The isolated container may appear as a real node from the point of view of software applications executed in it, but the applications only have visibility to resources of the source node allocated to it, believing these to be all that are available. Creation of the isolated container, then, may include the source node configured to install the software module in the isolated container.

From another perspective, in some examples, the neighbor node 402*b* is configured to receive a request from the source node 402*a* for a software module usable to process a particular modality of data. This responsive to the source node failing to locate the software module in a local model repository MR 410*a*, with the request broadcast from the source node to the neighbor nodes 402*b*, 402*c*. In some examples, the request includes a unique identifier, and the neighbor node is further configured to verify that the request is a new request for the particular software module from the source node 402*a*, using the unique identifier and a record of previous requests received by the neighbor node.

Responsive to the request, the neighbor node 402*b* is configured to search a respective local MR 410*b* of the neighbor node for the software module. The neighbor node 402*b* is configured to rebroadcast the request to those of the plurality of nodes in radio range of the neighbor node that are thereby further neighbor nodes 402*d*, 402*e*, responsive to the neighbor node failing to locate the software module in the respective local MR.

In some examples, the neighbor node 402*b* is configured to search the respective MR 410*b* for the software module that is specifically identified, and rebroadcast the request that specifically identifies the software module. In other examples, the neighbor node is configured to search the respective MR for any software module usable to process the particular modality of data, without specific identification of the software module. In these examples, the neighbor node is configured to rebroadcast the request that describes the particular modality of data, and excludes specific identification of the software module.

The neighbor node 402*b* is configured to receive the software module from a further neighbor 402*d* node of the further neighbor nodes. This may include, in some examples, the neighbor node configured to receive a response from the further neighbor node that indicates the further neighbor node has the software module. In these examples, the neighbor node is configured to unicast a second request for the software module to the further neighbor node, and receive the software module from the further neighbor node in response to the second request.

Following receipt of the software module, the neighbor node 402*b* is configured to return the software module to the source node 402*a* that uses the software module to process the particular modality of data. This may include, in some examples, the neighbor node configured to send a response to the source node that indicates the neighbor node has the software module. The neighbor node is then configured to receive a second request for the software module unicast from the source node, and return the software module to the source node in response to the second request.

Figure 5:
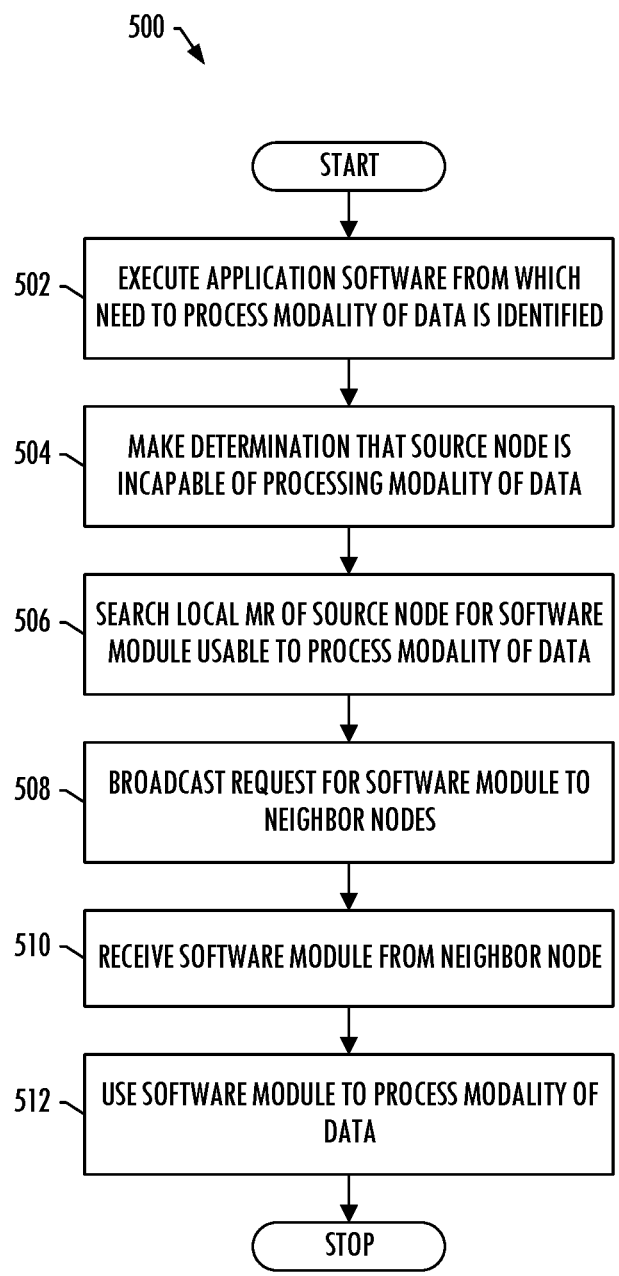
FIGS. 5 and 6 are flowcharts illustrating various steps in methods of acquiring software by a source node in a wireless ad hoc network that includes a plurality of nodes, according to example implementations.

FIG. 5 is a flowchart illustrating various steps in a method 500 of acquiring software by a source node 402*a* in a wireless ad hoc network 400 that includes a plurality of nodes 402, according to example implementations. As shown at blocks 502 and 504, the method includes the source node executing application software 408*a* from which a need to process a particular modality of data is identified, and making a determination that the source node is incapable of processing the particular modality of data. Responsive to the determination, the method includes the source node searching a local module repository MR 410*a* of the source node for a software module usable to process the particular modality of data, as shown at block 506. The method includes the source node broadcasting a request for the software module to those of the plurality of nodes in radio range of the source node that are thereby neighbor nodes 402*b*, 402*c*, responsive to the source node failing to locate the software module in the local MR, as shown at block 508.

A neighbor node 402*b* of the neighbor nodes responsive to the request, searches a respective local MR 410*b* of the neighbor node for the software module. The neighbor node rebroadcasts the request to those of the plurality of nodes in radio range of the neighbor node that are thereby further neighbor nodes 402*d*, 402*e*, responsive to the neighbor node failing to locate the software module in the respective local MR. And the neighbor node receives the software module from a further neighbor node 402*d* of the further neighbor nodes. The method then further includes the source node receiving the software module from the neighbor node, and using the software module to process the particular modality of data, as shown at blocks 510 and 512.

Figure 6:
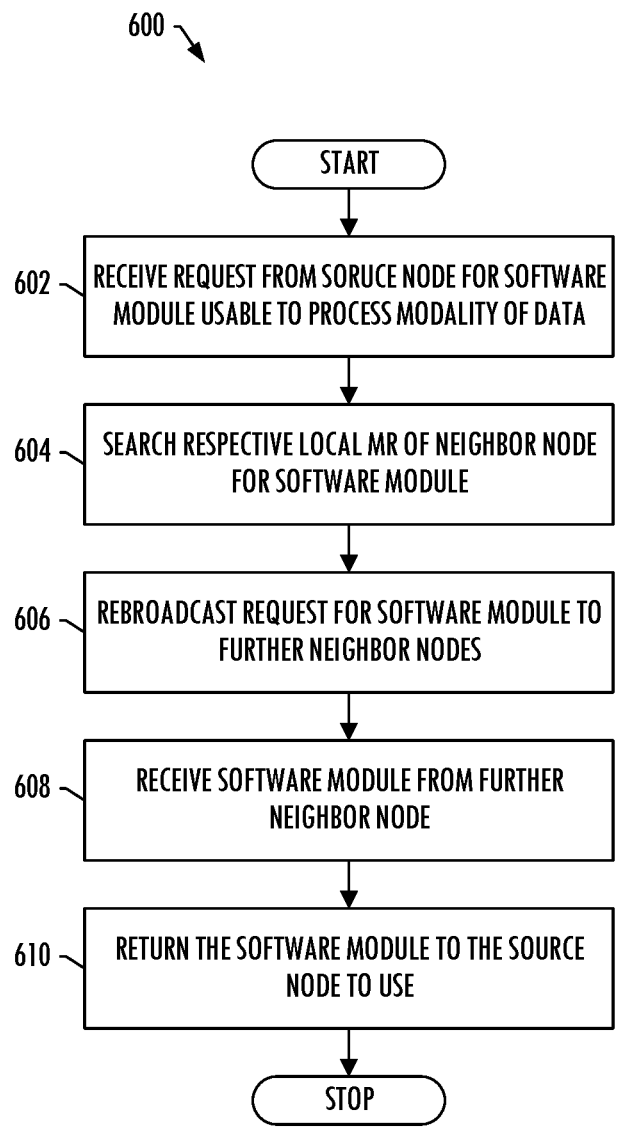

FIG. 6 is a flowchart illustrating various steps in a method 600 of acquiring software by a source node 402*a* in a wireless ad hoc network 400 that includes a plurality of nodes 402 in which those of which in radio range of the source node are neighbor nodes 402*b*, 402*c*, according to other example implementations. As shown at block 602, the method includes a neighbor node 402*b* of the neighbor nodes receiving a request from the source node for a software module usable to process a particular modality of data. The request is received responsive to the source node failing to locate the software module in a local model repository MR 410*a*, and broadcast from the source node to the neighbor nodes.

Responsive to the request, the neighbor node 402*b* searches a respective local MR 410*b* of the neighbor node for the software module, as shown at block 604. The neighbor node rebroadcasts the request to those of the plurality of nodes in radio range of the neighbor node that are thereby further neighbor nodes 402*d*, 402*e*, responsive to the neighbor node failing to locate the software module in the respective local MR, as shown at block 606. And the neighbor node receives the software module from a further neighbor node 402*d* of the further neighbor nodes, and returns the software module to the source node 402*a* that uses the software module to process the particular modality of data, as shown at blocks 608 and 610.

According to example implementations of the present disclosure, the software modules 108, 208, 408a, the MR 110, 210, 410a, 410b, and the MSS 112, 212, as well as the nodes 402, may be implemented or otherwise executed by various means. These means may include hardware, alone or under direction of one or more computer programs from a computer-readable storage medium. In some examples, one or more apparatuses may be configured to function as or otherwise implement or execute the software modules, MR and MSS, as well as the nodes, shown and described herein.

Figure 7:
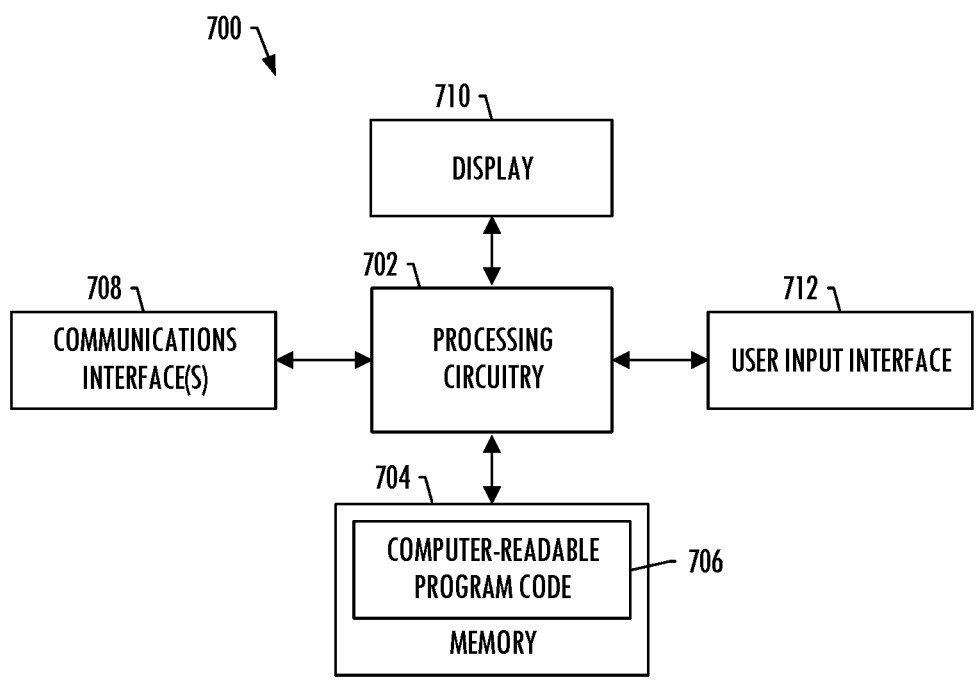
FIG. 7 illustrates an apparatus according to some example implementations.

FIG. 7 illustrates an apparatus 700 according to some example implementations of the present disclosure. Generally, an apparatus of example implementations of the present disclosure may comprise, include or be embodied in one or more fixed or portable electronic devices. Examples of suitable electronic devices include computers such as desktop computers, server computers, portable computers (e.g., laptop computer, tablet computer), mobile phones (e.g., cell phone, smartphone), wearable computers (e.g., smartwatch), or the like. The apparatus may include one or more of each of a number of components such as, for example, processing circuitry 702 (e.g., processor unit) connected to a memory 704 (e.g., storage device).

The processing circuitry 702 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 704 (of the same or another apparatus).

The processing circuitry 702 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 704 is generally any piece of computer hardware that is capable of storing information such as, for example, data, computer programs (e.g., computer-readable program code 706) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 704, the processing circuitry 702 may also be connected to one or more interfaces for displaying, transmitting and/or receiving information. The interfaces may include a communications interface 708 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 710 and/or one or more user input interfaces 712 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 700 may include a processing circuitry 702 and a computer-readable storage medium or memory 704 coupled to the processing circuitry, where the processing circuitry is configured to execute computer-readable program code 706 stored in the memory. It will also be understood that one or more functions, and combinations of functions, may be implemented by special purpose hardware-based computer systems and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A source node operable in a wireless ad hoc network that includes a plurality of nodes, the source node comprising:
   a memory configured to store computer-readable program code; and
   processing circuitry configured to access the memory, and execute the computer-readable program code to cause the source node to at least:
   execute application software from which a need to process a particular modality of data is identified;
   make a determination that the source node is incapable of processing the particular modality of data; and responsive to the determination,
   search a local module repository (MR) of the source node for a software module usable to process the particular modality of data;
   broadcast a request for the software module to those of the plurality of nodes in radio range of the source node that are thereby neighbor nodes, responsive to the source node failing to locate the software module in the local MR, a neighbor node of the neighbor nodes to search a respective local MR of the neighbor node for the software module;
   receive the software module from the neighbor node; and
   use the software module to process the particular modality of data.

2. The source node of claim 1, wherein the source node has a collection of sensors, a sensor of the sensors configured to produce or provide the particular modality of data to the application software from which the need to process the particular modality of data is identified.

3. The source node of claim 1, wherein the determination is made by the application software, or from a request received by the source node from a remote terminal.

4. The source node of claim 1, wherein the source node is caused to search the local MR for the software module that is specifically identified, and
   wherein the source node is caused to broadcast the request that specifically identifies the software module.

5. The source node of claim 1, wherein the source node is caused to search the local MR for any software module usable to process the particular modality of data, without specific identification of the software module, and
   wherein the source node is caused to broadcast the request that describes the particular modality of data, and excludes specific identification of the software module.

6. The source node of claim 1, wherein the source node caused to receive the software module from the neighbor node includes the source node caused to at least:
   receive a response from the neighbor node that indicates the neighbor node has the software module;
   unicast a second request for the software module to the neighbor node; and
   receive the software module from the neighbor node in response to the second request.

7. The source node of claim 1, wherein the source node is caused to use the software module includes the source node caused to at least:
   perform an operating-system-level containerization, including create and launch an isolated container on the source node in which to use the software module, the source node caused to create the isolated container including the source node caused to install the software module in the isolated container.

8. A neighbor node operable in a wireless ad hoc network that includes a plurality of nodes those of which in radio range of a source node being neighbor nodes, the neighbor node comprising:
   a memory configured to store computer-readable program code; and
   processing circuitry configured to access the memory, and execute the computer-readable program code to cause the neighbor node to at least:
   receive a request from the source node for a software module usable to process a particular modality of data, responsive to the source node failing to locate the software module in a local model repository (MR), the request broadcast from the source node to the neighbor nodes, the neighbor node responsive to the request caused to at least:
   search a respective local MR of the neighbor node for the software module;
   receive the software module; and
   return the software module to the source node that uses the software module to process the particular modality of data.

9. The neighbor node of claim 8, wherein the request includes a unique identifier, and the processing circuitry is configured to execute the computer-readable program code to further cause the neighbor node to verify that the request is a new request for the particular software module from the source node, using the unique identifier and a record of previous requests received by the neighbor node.

10. The neighbor node of claim 8, wherein the neighbor node is caused to receive the software module from a further neighbor node, including the neighbor node caused to at least:
    receive a response from the further neighbor node that indicates the further neighbor node has the software module;
    unicast a second request for the software module to the further neighbor node; and
    receive the software module from the further neighbor node in response to the second request.

11. The neighbor node of claim 8, wherein the neighbor node caused to return the software module to the source node includes the neighbor node caused to at least:
    send a response to the source node that indicates the neighbor node has the software module;
    receive a second request for the software module unicast from the source node; and
    return the software module to the source node in response to the second request.

12. A method of acquiring software by a source node in a wireless ad hoc network that includes a plurality of nodes, the method comprising the source node:
    executing application software from which a need to process a particular modality of data is identified;
    making a determination that the source node is incapable of processing the particular modality of data; and responsive to the determination,
    searching a local module repository (MR) of the source node for a software module usable to process the particular modality of data;
    broadcasting a request for the software module to those of the plurality of nodes in radio range of the source node that are thereby neighbor nodes, responsive to the source node failing to locate the software module in the local MR, a neighbor node of the neighbor nodes to search a respective local MR of the neighbor node for the software module;
    receiving the software module from the neighbor node; and
    using the software module to process the particular modality of data.

13. The method of claim 12, wherein the source node has a collection of sensors, and the method further comprises a sensor of the sensors:
    producing or providing the particular modality of data to the application software from which the need to process the particular modality of data is identified.

14. The method of claim 12, wherein the determination is made by the application software, or from a request received by the source node from a remote terminal.

15. The method of claim 12, wherein searching the local MR includes searching the local MR for the software module that is specifically identified, and
    wherein broadcasting the request includes broadcasting the request that specifically identifies the software module.

16. The method of claim 12, wherein searching the local MR includes searching the local MR for any software module usable to process the particular modality of data, without specific identification of the software module, and
    wherein broadcasting the request includes broadcasting the request that describes the particular modality of data, and excludes specific identification of the software module.

17. The method of claim 12, wherein the source node receiving the software module from the neighbor node includes the source node:
    receiving a response from the neighbor node that indicates the neighbor node has the software module;
    unicasting a second request for the software module to the neighbor node; and
    receiving the software module from the neighbor node in response to the second request.

18. The method of claim 12, wherein using the software module includes the source node:
    performing an operating-system-level containerization, including creating and launching an isolated container on the source node in which to use the software module, creating the isolated container including installing the software module in the isolated container.

19. A method of acquiring software by a source node in a wireless ad hoc network that includes a plurality of nodes those of which in radio range of the source node being neighbor nodes, the method comprising a neighbor node of the neighbor nodes:
    receiving a request from the source node for a software module usable to process a particular modality of data, responsive to the source node failing to locate the software module in a local model repository (MR), the request broadcast from the source node to the neighbor nodes, the neighbor node responsive to the request:
    searching a respective local MR of the neighbor node for the software module;
    receiving the software module; and
    returning the software module to the source node that uses the software module to process the particular modality of data.

20. The method of claim 19, wherein the request includes a unique identifier, and the method further comprises the neighbor node:
    verifying that the request is a new request for the particular software module from the source node, using the unique identifier and a record of previous requests received by the neighbor node.

21. The method of claim 19, wherein the neighbor node receives the software module from a further neighbor node, including the neighbor node:
    receiving a response from the further neighbor node that indicates the further neighbor node has the software module;
    unicasting a second request for the software module to the further neighbor node; and
    receiving the software module from the further neighbor node in response to the second request.

22. The method of claim 19, wherein the neighbor node returning the software module to the source node includes the neighbor node:
    sending a response to the source node that indicates the neighbor node has the software module;
    receiving a second request for the software module unicast from the source node; and
    returning the software module to the source node in response to the second request.

* * * * *